(12) United States Patent
Jung

(10) Patent No.: US 11,984,560 B2
(45) Date of Patent: May 14, 2024

(54) VACUUM HOPPER PRECHARGER

(71) Applicant: TM PLAZA CO., LTD., Ulsan (KR)

(72) Inventor: Yong Gyu Jung, Ulsan (KR)

( * ) Notice: Subject to any disclaimer, the term of this patent is extended or adjusted under 35 U.S.C. 154(b) by 426 days.

(21) Appl. No.: 17/287,616

(22) PCT Filed: Nov. 14, 2019

(86) PCT No.: PCT/KR2019/015557
§ 371 (c)(1),
(2) Date: Apr. 22, 2021

(87) PCT Pub. No.: WO2020/138715
PCT Pub. Date: Jul. 2, 2020

(65) Prior Publication Data
US 2021/0399349 A1    Dec. 23, 2021

(30) Foreign Application Priority Data

Dec. 26, 2018   (KR) ........................ 10-2018-0168976

(51) Int. Cl.
*H01M 10/42*    (2006.01)
*H01M 10/44*    (2006.01)
(Continued)

(52) U.S. Cl.
CPC ... *H01M 10/4214* (2013.01); *H01M 10/4235* (2013.01); *H01M 10/44* (2013.01); *H01M 10/46* (2013.01); *H01M 10/52* (2013.01)

(58) Field of Classification Search
CPC ......... H01M 10/4214; H01M 10/4235; H01M 10/44; H01M 10/46; H01M 10/52
(Continued)

(56) References Cited

U.S. PATENT DOCUMENTS 1,096,085 A * 5/1914 White ..................... C25B 15/00
205/516

FOREIGN PATENT DOCUMENTS

KR    10-2009-0036793 A      4/2009
KR       20160088574 A  *  7/2016   ............ H01M 50/30
(Continued)

OTHER PUBLICATIONS

KR20170095013A—English Translation (Year: 2017).*
KR20160088574A—English Translation (Year: 2016).*

*Primary Examiner* — Timothy P. Kelly
*Assistant Examiner* — Christopher M Afful
(74) *Attorney, Agent, or Firm* — KORUS Patent, LLC; Seong Il Jeong

(57) ABSTRACT

The present invention provides a vacuum hopper precharger configured such that an electrolyte and gases contained in the electrolyte are suctioned by a vacuum hopper, the gases inside the electrolyte are discharged to the outside, and the electrolyte is stored in a vacuum nozzle of the vacuum hopper and then supplied into the secondary battery, thereby reducing defects of the secondary battery and lengthening the life thereof. The present invention comprises: a base frame 20 put in a floor and having an interior space 21; a gas removal part 30 installed on an upper portion of the interior space 21 and removing gases inside a secondary battery 100; an elevator 40 installed on a lower portion of the interior space 21 at an area corresponding to the gas removal part 30, receiving the secondary battery 100 on a top portion thereof, and moving the secondary battery 100 upward or downward; and a controller 50 controlling the gas removal part 30 and the elevator 40.

3 Claims, 11 Drawing Sheets

(51) Int. Cl.
*H01M 10/46* (2006.01)
*H01M 10/52* (2006.01)

(58) Field of Classification Search
USPC .......................................................... 141/59
See application file for complete search history.

(56) References Cited

FOREIGN PATENT DOCUMENTS

KR  10-2017-0095013 A   8/2017
KR      20170095013 A  *  8/2017  ........ H01M 10/0404

* cited by examiner

Prior Art

Prior Art

VACUUM HOPPER PRECHARGER

TECHNICAL FIELD

The invention relates to a vacuum hopper precharger and more particularly, to a vacuum hopper precharger configured such that an electrolyte of a secondary battery and gases contained in the electrolyte are suctioned through a vacuum hopper, the gases contained in the electrolyte are discharged to the outside, and the electrolyte is stored in a vacuum nozzle of the vacuum hopper and then supplied into the secondary battery, thereby reducing defects of the secondary battery and lengthening the life thereof.

BACKGROUND ART

A secondary battery is being generally applied to an electric vehicle or a hybrid electric hybrid vehicle, which are driven by an electrical drive source, as well as portable devices, due to its ease of applicability over a wide range of products and an electrical property of a high energy density. The secondary battery is regarded as a new energy source for environment-friendliness and energy efficiency in terms of no side products as well as a primary advantage of reduction of fossil fuel usage.

Currently widely used secondary batteries are a lithium-ion battery, a lithium-polymer battery, a nickel-cadmium battery, a nickel-hydrogen battery, a nickel-zinc battery, and others. The operating voltage of a unit second battery cell of these is from about 25V to about 45V. Accordingly, when higher output voltage is required, a battery pack may consist of a plurality of battery cells connected in series. In addition, a battery pack may consist of a plurality of battery cells connected in parallel according to charge and discharge capacity required to the battery pack. Therefore, the number of the battery cells included in the battery pack can be varied depending on the required output voltage or the charge and discharge capacity.

Meanwhile, in case a battery pack consists of multiple battery cells in series or in parallel, it is manufactured according to a general way that a battery module consisting of a least one battery cell is provided first, and other components are added to the battery module.

Recently, a lithium-polymer battery, especially a pouch type secondary battery, is widely being used since the pouch type secondary battery has high energy density per unit weight and unit volume, can be formed as a thin shape, and its weight can be lightened.

The general manufacturing method of a battery cell of a pouch type secondary battery is as follows.

First, an electrode assembly is manufactured by making a cathode plate and an anode plate, disposing a separator therebetween, and building a stack with these elements. Then, a plasticizer, such as Dibutyl phthalate (DBP), is extracted from the manufactured electrode assembly, and the electrode assembly is mounted inside a pouch case by welding an electrode tab to an electrode lead of the electrode assembly. After mounting the electrode assembly inside the pouch case, an electrolyte is impregnated into the electrode assembly by injecting the electrolyte inside the pouch case. After the electrolyte is injected, the pouch case is sealed by heat-bonding edges of the pouch case. Then, an aging process is performed to stabilize the assembled battery cell, and a charging and discharging process is performed to activate the battery cell. However, when performing the charging and discharging process, an irreversible reaction of the electrolyte and an additive agent is occurred according to formation of a Solid Electrolyte Interphase (SEI) layer, thereby generating gases. The gases inside the pouch case is needed to be removed, and if the gases are not removed, it causes defects of the battery cell. Accordingly, a gas removal process is performed using a gas removal device of the battery cell to remove the gases inside the pouch case.

Prior arts related to the gas removal device of the battery cell, a vacuum hopper precharger, mentioned above includes Korean Patent No. 10-0433836 (Registration Date: May 20, 2004), a gas removal device of a secondary battery. As shown in FIG. 1, the gas removal device of a secondary battery disclosed in the Korean Patent comprises a base 100 and a chamber 200 that is installed on the base 100 and that includes an upper chamber 210 performing an uplift movement and a lower chamber 220 installed on a top side of the base 100 by a fixing leg 110.

In addition, Korean Patent Application Publication No. 10-2018-0062835 (Publication Date: Jun. 11, 2018) discloses a battery cell degassing device. As shown in FIG. 2, the battery cell degassing device comprises: a chamber cover 100 in which a battery cell is separably sit; a vacuum chamber 200 slidingly connected to the chamber cover 100 in a horizontal direction of the chamber cover 100 and capable of receiving the battery cell under a vacuum atmosphere; a piercing unit 300 equipped in the vacuum chamber 200 and piercing a portion of the gas pocket 59; and a pressurization unit 400 equipped in the vacuum chamber 200 in a way that it is spaced apart from the piercing unit 300 and discharging gases inside the battery cell to the outside by flattening a top side and a bottom side of the battery cell.

However, the prior arts mentioned above have problems that several processes for operating the device require a significant amount of time. Specifically, since the devices in the prior arts can remove gases inside the battery cell in a chamber in a vacuumed state, processes for vacuuming the chamber and injecting air into the chamber after removing the gases, are required, and take a long time.

DISCLOSURE

Technical Problem

Accordingly, the present invention is suggested to solve the problems mentioned above, one object of the invention is to provide a new type of a vacuum hopper precharger configured such that the electrolyte of a secondary battery and gases contained in the electrolyte are suctioned through a vacuum hopper, the gases contained in the electrolyte are discharged to the outside, and the electrolyte is stored in a vacuum nozzle of the vacuum hopper and then supplied into the secondary battery, thereby reducing defects of the secondary battery and lengthening the life thereof.

Technical Solution

According to one aspect of the invention to accomplish the above-mentioned object, a vacuum hopper precharger of the present invention comprises: a base frame 20 put in a floor and having an interior space 21; a gas removal part 30 installed in an upper portion of the interior space 21 of the base frame 20 and removing gases inside a secondary battery 100; an elevator 40 installed in a lower portion of the interior space 21 of the base frame 20 at an area corresponding to the gas removal part 30, receiving the secondary battery 100 on a top portion thereof, and moving the secondary battery 100 upward or downward; and a controller 50 controlling the gas removal part 30 and the elevator 40.

In this vacuum hopper precharger according to the present invention, the gas removal part 30 comprises: a fixing part 60 comprising a plate 61 fixed to and installed on an upper portion of the base frame 20 and a plurality of width bars 63 movably installed on a bottom side of the plate 61 in a length direction; a vacuum hopper 70 a top portion thereof connected to the width bar 63 of the fixing part 60 and removing gases inside the secondary battery 100, and a pressurization part 80 a top portion thereof connected to the width bar 63, disposed in proximity to the vacuum hopper 70, and pressurizing a top portion of the secondary battery 100.

In addition, in this vacuum hopper precharger according to the present invention, the fixing part 60 comprises: the plate 61 fixed to and installed on an upper portion of the base frame 20; a plurality of rails 62 installed on a bottom side of the plate 61 in a length direction; a plurality of first width bars 63a extending in a direction perpendicular to the length direction of the rails and movably connected to a bottom portion of the rails 62, wherein the pressurization part 80 is connected to a bottom portion of the first width bar 63a; a plurality of second width bars 63b extending in a direction perpendicular to the length direction of the rails 62, movably connected to the bottom side of the rails 62, wherein the vacuum hopper 70 is connected to a bottom portion of the second width bar 63b; a sensor 64 installed on an end of the bottom side of the plate 61, spaced apart from the rails 62, and sensing movements of the first width bar 63a and the second width bar 63b; a first drive motor 65 moving the first width bar 63a in the length direction, and a second drive motor 66 moving the second width bar 63b in the length direction.

Furthermore, in this vacuum hopper precharger according to the present invention, the vacuum hopper 70 comprises:
a connection bar 71 connected to the bottom portion of the second width bar 63b; a vacuum manifold 72 connected to a bottom portion of the connection bar 71 and including a plurality of vacuum holes 721 penetrating the vacuum manifold 72 from a top side to a bottom side of the vacuum manifold 72; a cover 73 covering a top portion of the manifold 72; connectors 74 connected to both sides of the vacuum manifold 72, communicating with the vacuum hole 721 of the vacuum manifold 72, and one side of the connectors 74 connected to a vacuum pump 732 and an air pump 733; a connection pipe 75 connecting between the connectors 74; a vacuum nozzle 76 having a cylindrical shape with a hollow 761 inside, connected to the vacuum manifold 72 through a lower portion of the vacuum hole 721 of the vacuum manifold 72, and storing an electrolyte suctioned from the secondary battery 100; an opening and closing member 77 a top portion thereof connected to the cover 73, inserted into the vacuum manifold 72 through the top portion of the vacuum hole 721 of the vacuum manifold 72, a bottom portion thereof having a size corresponding to that of the hollow 761 of the vacuum nozzle 76 and located on a top portion of the vacuum nozzle 76, and opening or closing a top portion of the hollow 761 of the vacuum nozzle 76 by moving the vacuum nozzle 76 upward and downward; and a supporting holder 78 a top portion thereof connected to both side ends of the vacuum manifold 72 and a bottom portion thereof supporting a bottom portion of the vacuum nozzle 76.

In this vacuum hopper precharger according to the present invention, the vacuum nozzle 76 has a cylindrical shape with a hollow 761 inside, wherein the vacuum nozzle 76 comprises: a hitch end 762 formed on a top portion of an outer circumferential surface of the vacuum nozzle 76 and inserted through a bottom portion of the vacuum hole 721 of the vacuum manifold 72; a body 763 storing an electrolyte suctioned from the secondary battery 100; the o-ring 764 formed on the hitch end 762 of the body 763 and sealing between the vacuum hole 721 of the vacuum manifold 72 and the vacuum nozzle 76; an elastic member 765 formed on a bottom portion of the hitch end 762 of the body 763; a fixing member 766 formed on a bottom portion of the elastic member 765 and preventing separation of the elastic member 765; and a pad 767 connected to an end of the body 763 and meeting with a top portion of the secondary battery 100.

Moreover, in this vacuum hopper precharger according to the present invention, the pressurization part 80 has a square frame shape, wherein the pressurization part 80 comprises: a fixing member 81 connected to a bottom portion of the first width bar 63a; and an elastic member 82 connected to a bottom portion of the fixing member 81, meeting with a top portion of the secondary battery 100, and providing an elastic force.

Advantageous Effects

According to a vacuum hopper precharger of the present invention mentioned above, the vacuum hopper precharger is configured such that the electrolyte of a secondary battery and gases included in the electrolyte are suctioned through a vacuum hopper, the gases included in the electrolyte are discharged to the outside, and the electrolyte is stored in a vacuum nozzle of the vacuum hopper and then supplied into the secondary battery, thereby reducing defects of the secondary battery and lengthening the life thereof.

BEST MODE FOR INVENTION

Figure 1:
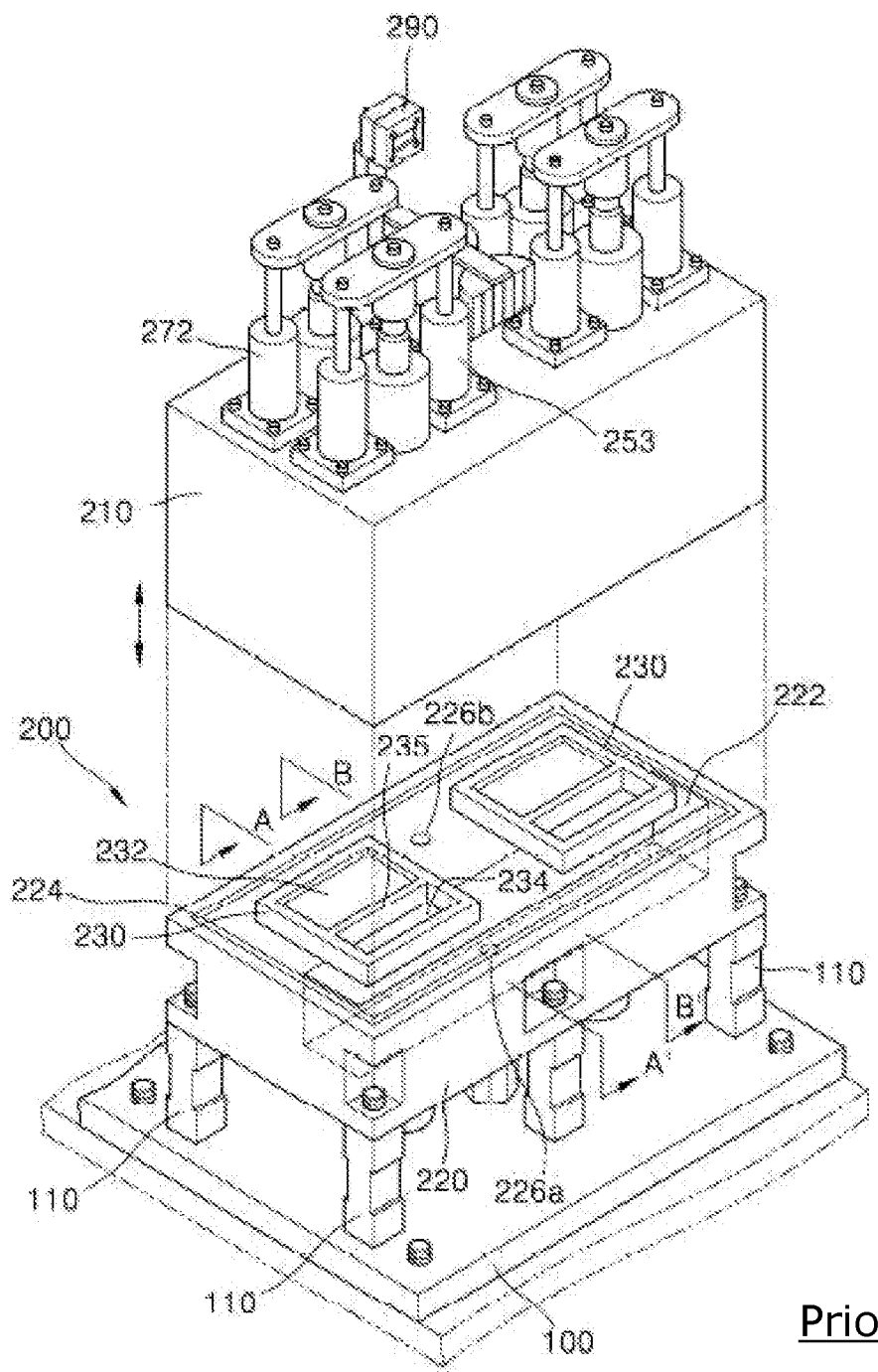
FIGS. 1 and 2 are drawings to explain prior arts.
Figure 2:
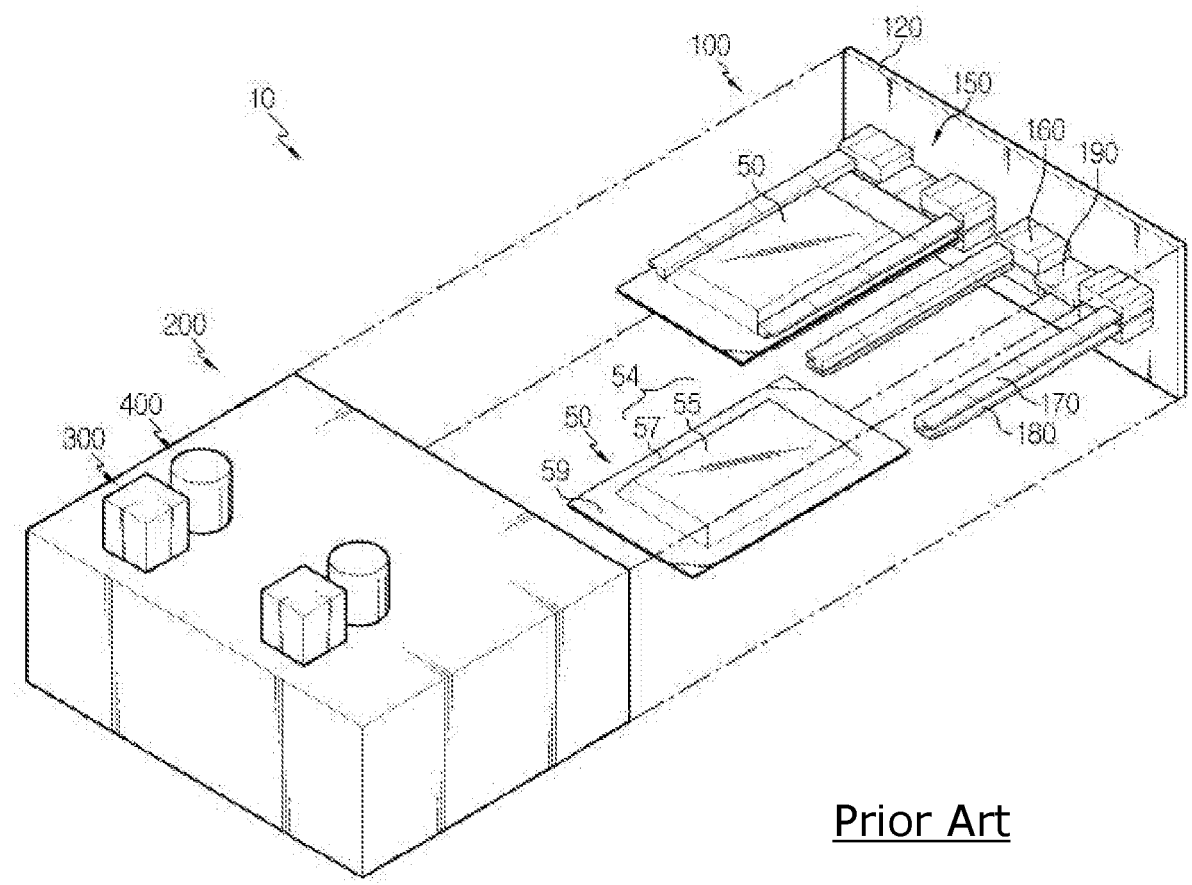
Figure 3:
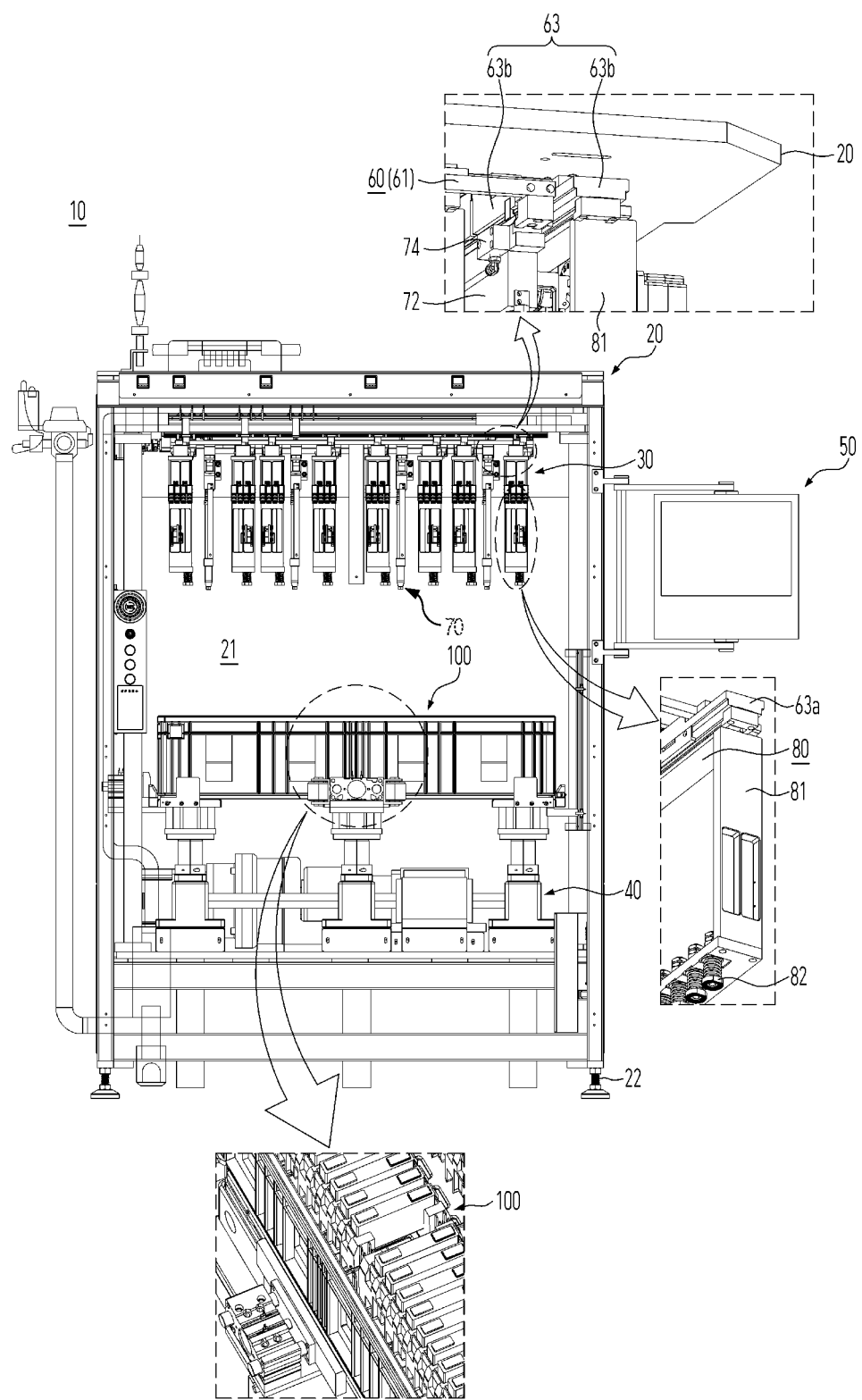
FIG. 3 is a front view of a vacuum hopper precharger according to a preferred embodiment of the present invention.
Figure 4:
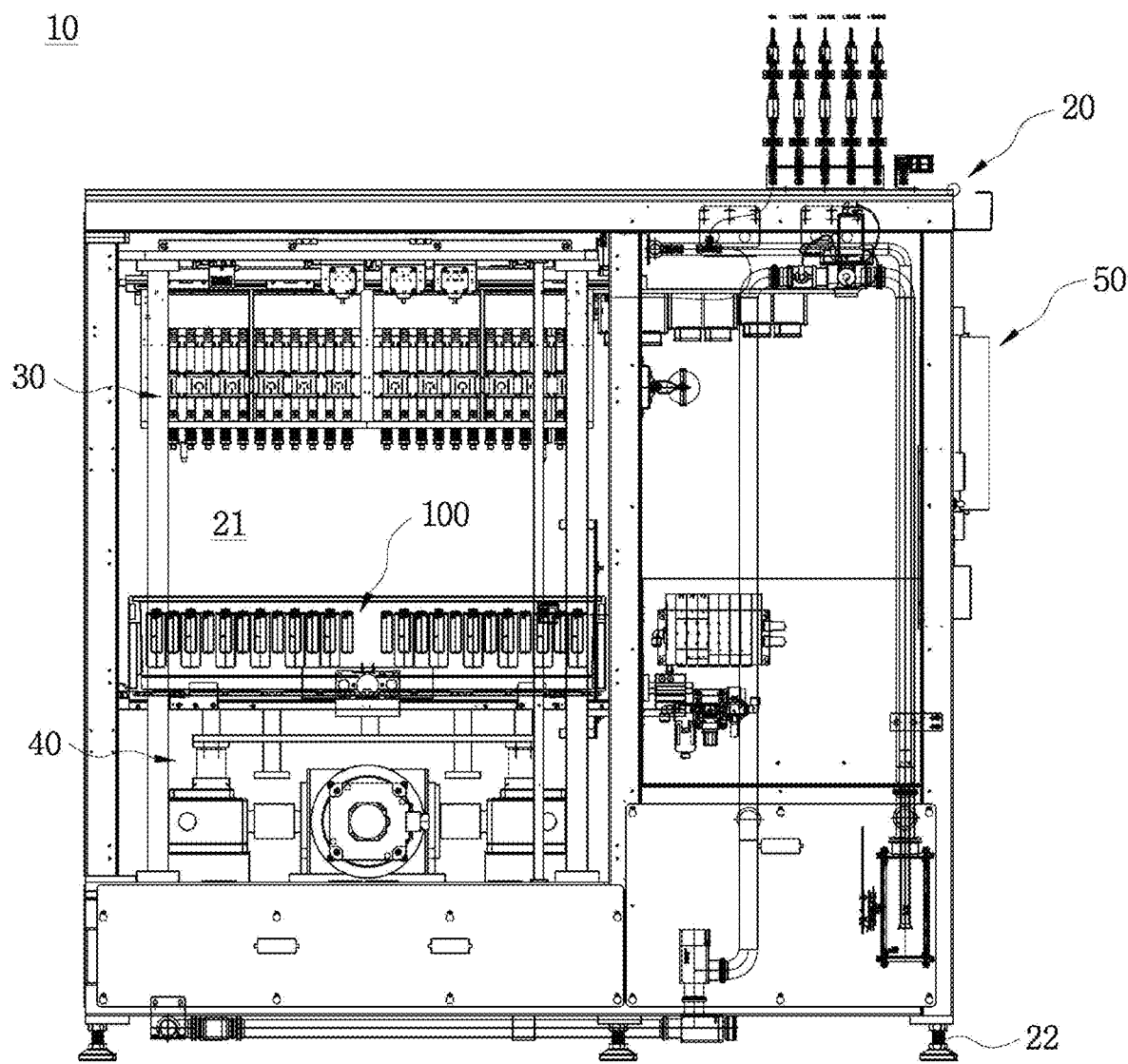
FIG. 4 is a left side view of a vacuum hopper precharger according to a preferred embodiment of the present invention.

Hereinafter, preferred embodiments of the invention will be described in detail in conjunction with the accompanying drawings. In FIGS. 3 to 11, components performing the same function are referred to as the same referral number. Meanwhile, in drawings and specification, detailed description and drawings of compositions and effects regarding some elements, which are not directly related to the inventive concept of the present, are omitted; compositions related to the inventive concept of the present invention are shown and described.

Referring to FIG. 3 to 11, a vacuum hopper precharger 10 according to the present invention comprises: a base frame 20 put in a floor and having an interior space 21; a gas removal part 30 installed on an upper portion of the interior space 21 of the base frame 20 and removing gases inside a secondary battery 100; an elevator 40 installed on a lower portion of the interior space 21 of the base frame 20 at an area corresponding to that of the gas removal part 30, receiving the secondary battery 100 on the top thereof, and moving the secondary battery 100 upward or downward; and a controller 50 controlling the gas removal part 30 and the elevator 40.

Figure 5:
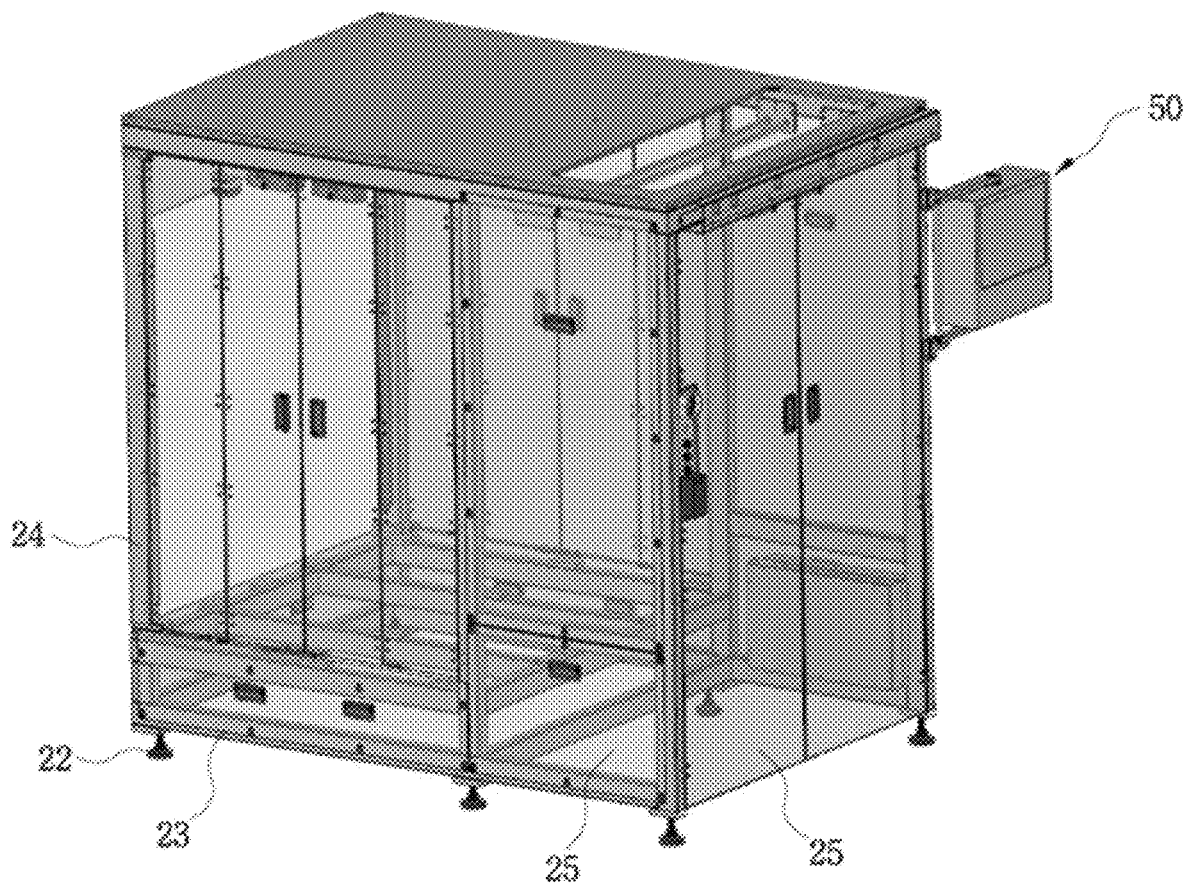
FIG. 5 is a drawing showing a base frame of a vacuum hopper precharger according to a preferred embodiment of the present invention.
Figure 6:
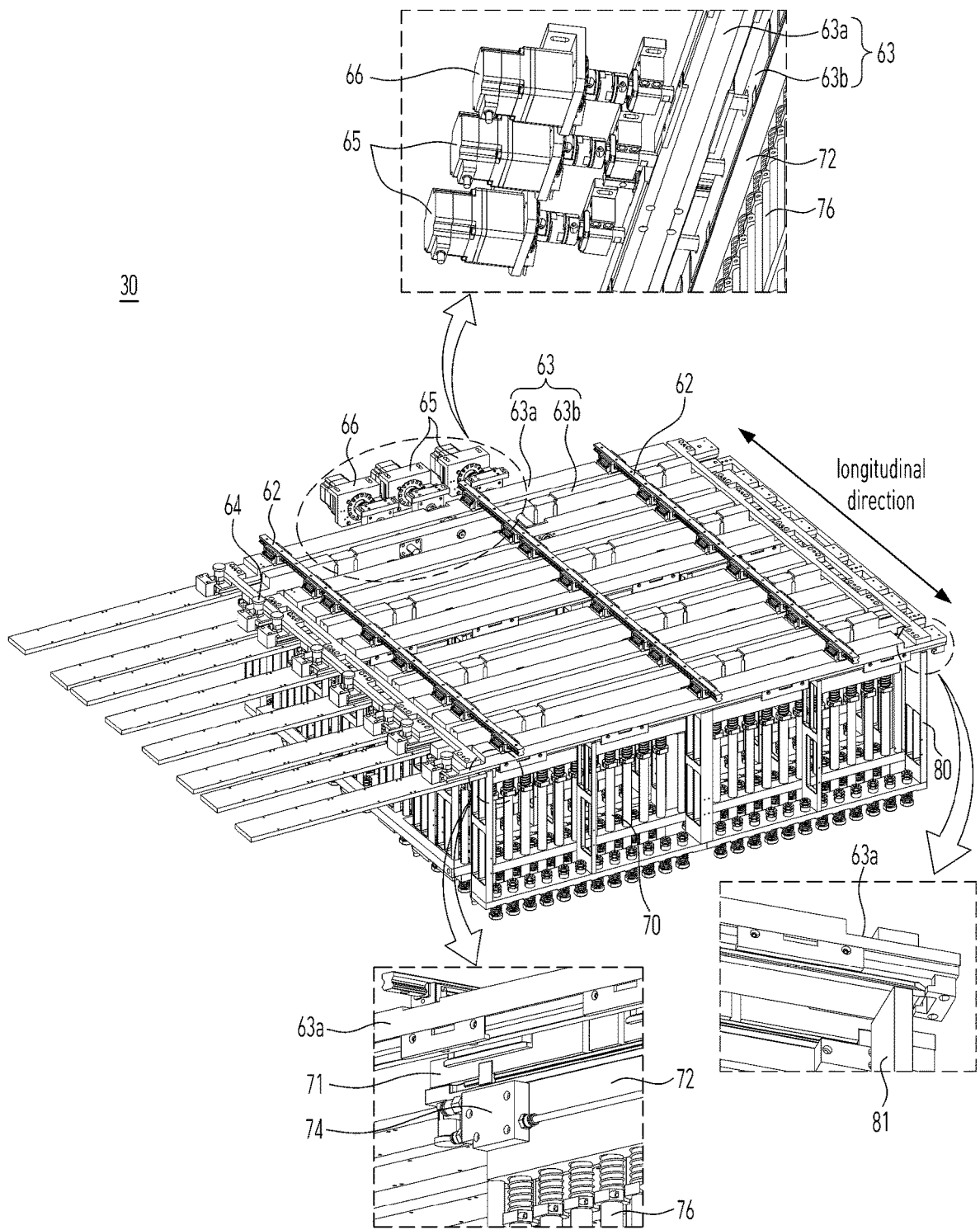
FIG. 6 is a perspective view of a gas removal part of a vacuum hopper precharger according to a preferred embodiment of the present invention.

The base frame 20 is formed as a box shape having the interior space 21 and includes legs 22 installed on a bottom side thereof, put on the floor, and absorbing vibration from the outside. As shown in FIG. 5, the base frame 20 comprises a horizontal bar 23 and a vertical bar 24, which are formed in edges thereof, and a door 25, which is formed between the horizontal bar 23 and the vertical bar 24 in a front side, a back side, and a lateral side thereof.

Meanwhile, the base frame 20 mentioned above is one embodiment of the present invention. It would be apparent that many more modifications and variations than mentioned above are possible by an ordinary person skilled in the art.

The gas removal part 30 is installed on the interior space 21 of the base frame 20 for removing gases contained in the electrolyte of the secondary battery 100, and comprises a fixing part 60, a vacuum hopper 70, and a pressurization part 80.

The fixing part 60 is a component for the gas removal part 30 to be fixed to and installed on an upper portion of the base frame 20. The fixing part 60 comprises a plate 61, which is fixed to and installed on the upper portion of the base frame 20, and a plurality of width bars 63, which are installed on a bottom side of the plate 61 to be movable from side to side.

Figure 7:
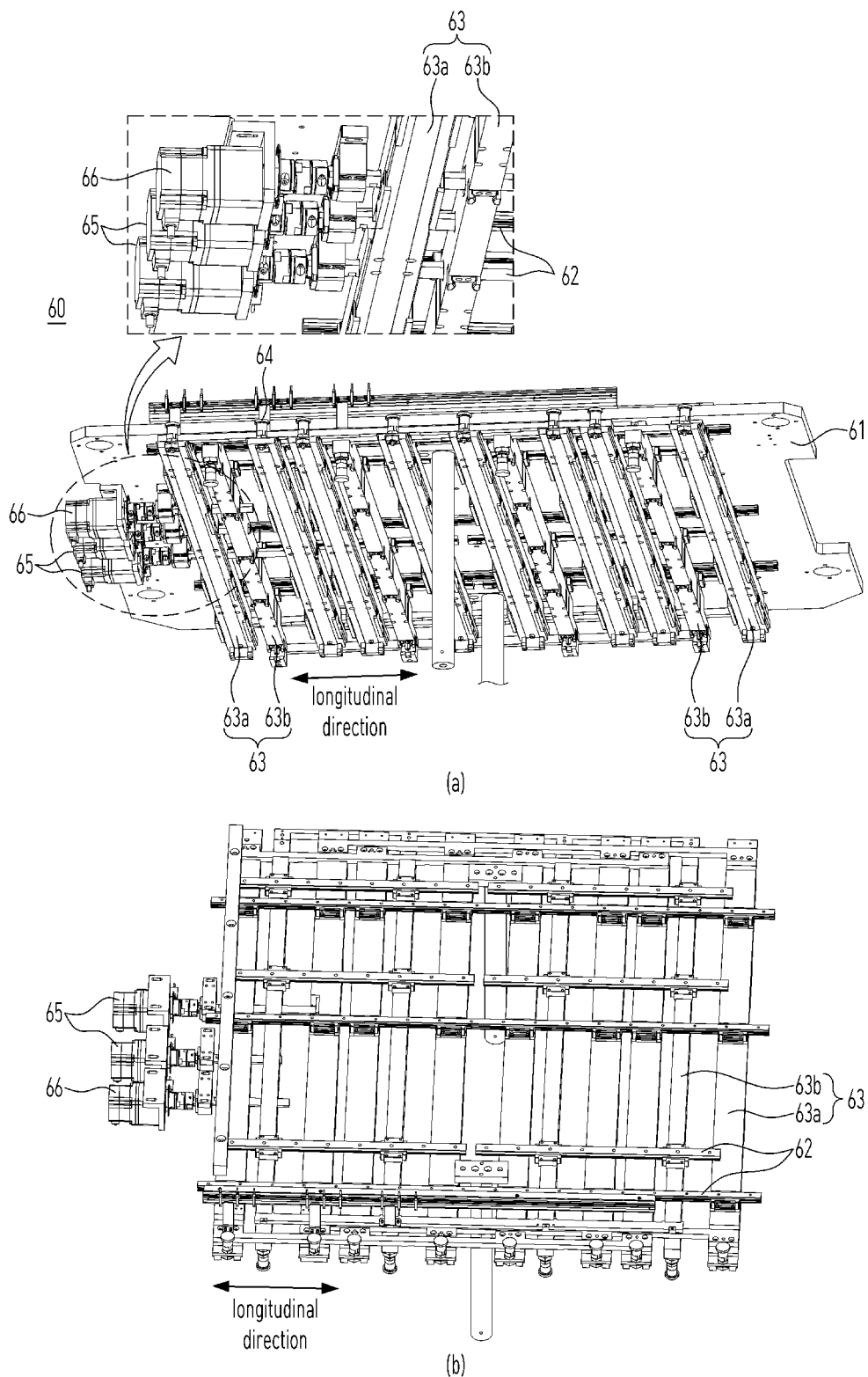
FIG. 7 is a drawing showing a fixing part of a gas removal part of a vacuum hopper precharger according to a preferred embodiment of the present invention.

Specifically, as shown in FIG. 7, the fixing part 60 comprises the plate 61 having a flat plate shape, fixed to and installed on the upper portion of the base frame 20; a plurality of rails 62 installed on the bottom side of the plate 61 in a length direction; a plurality of first width bars 63a extending in a direction perpendicular to the length direction of the rails and movably connected to a bottom portion of the rails 62, wherein the pressurization part 80 is connected to a bottom portion of the first width bar 63a; a plurality of second width bars 63b extending in a direction perpendicular to the length direction of the rails 62, movably connected to the bottom side of the rails 62, wherein the vacuum hopper 70 is connected to a bottom portion of the second width bar 63b; a sensor 64 installed on an end of the bottom side of the plate 61, spaced apart from the rails 62, and sensing movements of the first width bar 63a and the second width bar 63b; a first drive motor 65 moving the first width bar 63a in the length direction, and a second drive motor 66 moving the second width bar 63b in the length direction, Meanwhile, the second width bar 63b is installed on a location corresponding to that of the secondary battery 100 put in the elevator 40, and the first width bar 63a is installed in proximity to the second width bar 63b in order to pressurize a top portion of the secondary battery 100.

Figure 8:
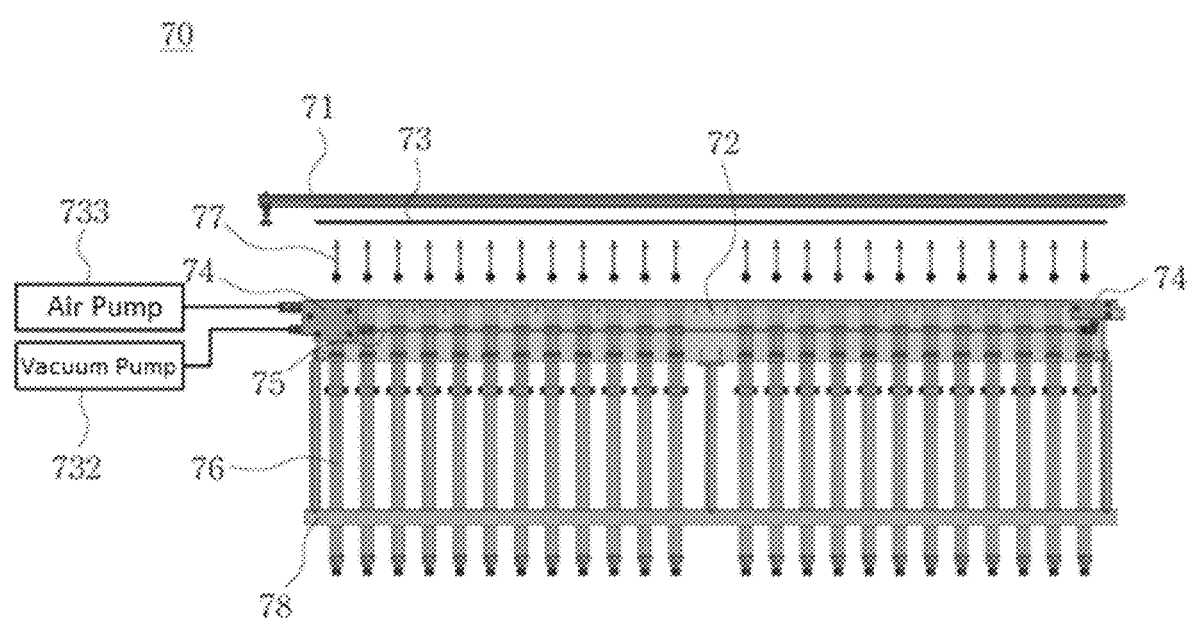
FIG. 8 is a drawing showing a vacuum hopper of a gas removal part of a vacuum hopper precharger according to a preferred embodiment of the present invention.
Figure 9:
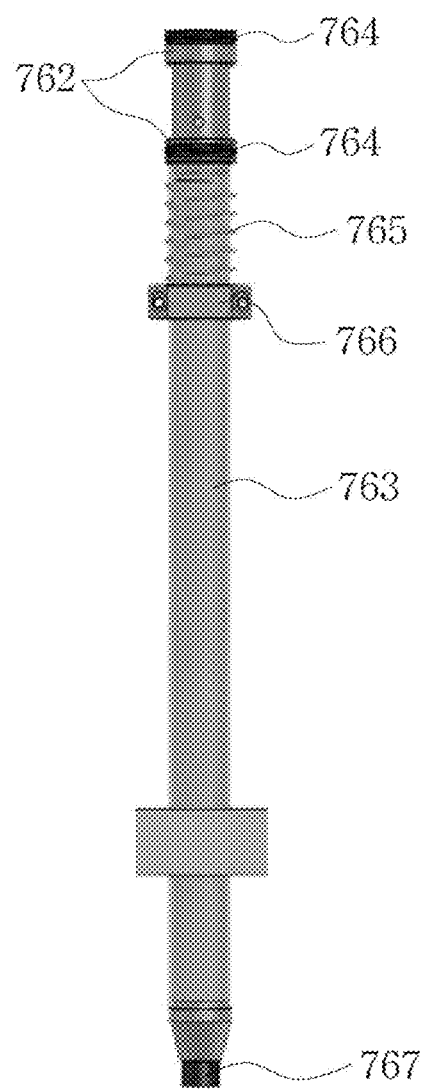
FIG. 9 is a drawing showing a vacuum nozzle of a gas removal part of a vacuum hopper precharger according to a preferred embodiment of the present invention.
Figure 10:
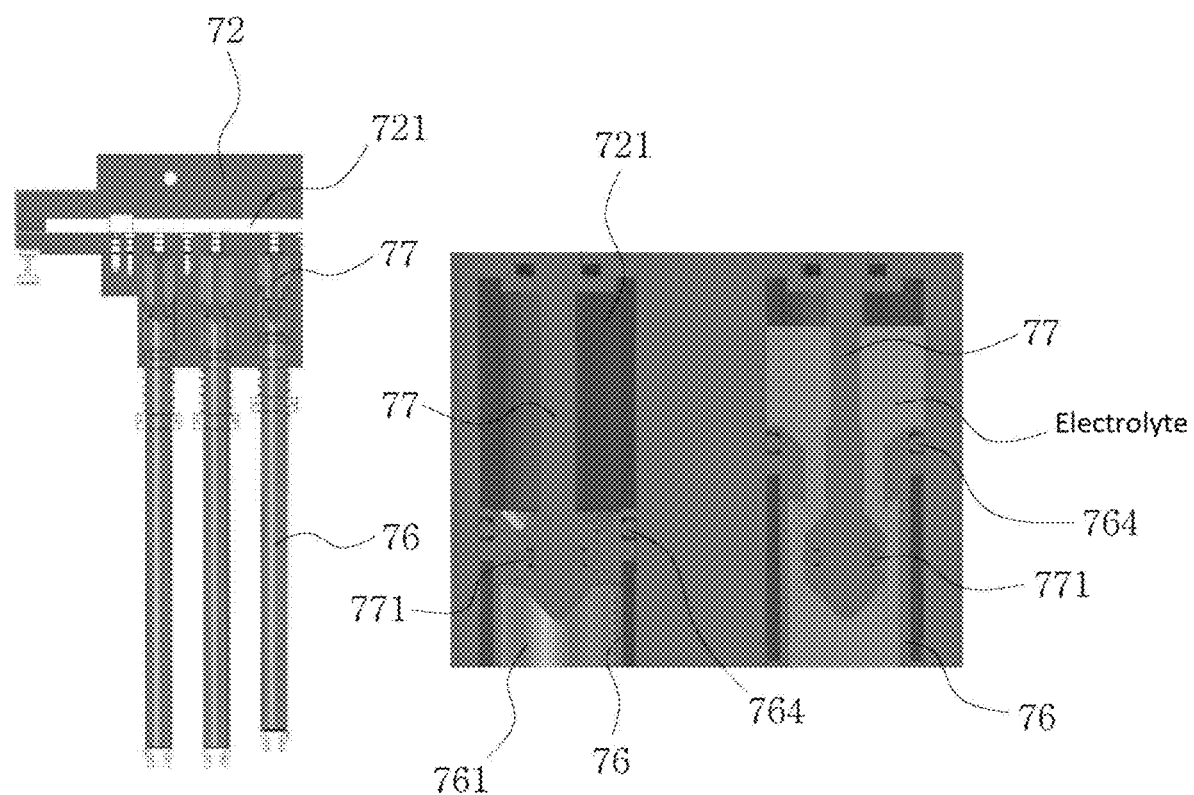
FIG. 10 is a drawing showing an operation of a vacuum nozzle of a gas removal part of a vacuum hopper precharger according to a preferred embodiment of the present invention.
Figure 11:
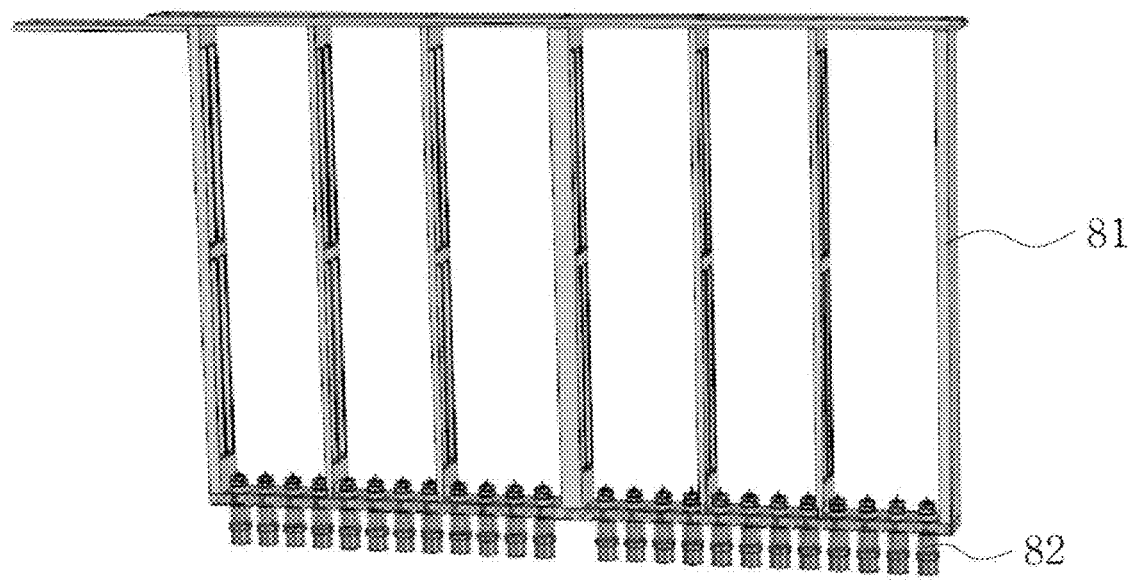
FIG. 11 is a drawing showing a pressurization part of a vacuum hopper precharger according to a preferred embodiment of the present invention.

The vacuum hopper 70 is a component for removing the gases inside the secondary battery 100, and a top portion of the vacuum hopper 70 is connected to the width bar 63 of the fixing part 70. As shown in FIG. 8, the vacuum hopper 70 comprises: a connection bar 71 connected to the bottom portion of the second width bar 63b; a vacuum manifold 72 connected to a bottom portion of the connection bar 71 and including a plurality of vacuum holes 721 penetrating the vacuum manifold 72 from a top side to a bottom side of the vacuum manifold 72; a cover 73 covering a top portion of the manifold 72; connectors 74 connected to both sides of the vacuum manifold 72, communicating with the vacuum hole 721 of the vacuum manifold 72, and one side of the connectors 74 connected to a vacuum pump 732 and an air pump 733; a connection pipe 75 connecting between the connectors 74; a vacuum nozzle 76 having a cylindrical shape with a hollow 761 inside, connected to the vacuum manifold 72 through a lower portion of the vacuum hole 721 of the vacuum manifold 72, and storing an electrolyte suctioned from the secondary battery 100; an opening and closing member 77 a top portion thereof connected to the cover 73, inserted into the vacuum manifold 72 through the top portion of the vacuum hole 721 of the vacuum manifold 72, a bottom portion thereof having a size corresponding to that of the hollow 761 of the vacuum nozzle 76 and located on a top portion of the vacuum nozzle 76, and opening or closing a top portion of the hollow 761 of the vacuum nozzle 76 by moving the vacuum nozzle 76 upward and downward; and a supporting holder 78 a top portion thereof connected to both side ends of the vacuum manifold 72 and a bottom portion thereof supporting a bottom portion of the vacuum nozzle 76. An o-ring 771 is formed on a bottom portion of the opening and closing member 77, and seals between the vacuum hole 721 of the vacuum manifold 72 and the vacuum nozzle 76 when the opening and closing member 77 meets with a top portion of the hollow 761 of the vacuum nozzle 76.

Meanwhile, the vacuum nozzle 76 has a cylindrical shape with hollow 761 inside. The vacuum nozzle 76 comprises a hitch end 762 formed on a top portion of an outer circumferential surface of the vacuum nozzle 76 and inserted through a bottom portion of the vacuum hole 721 of the vacuum manifold 72; a body 763 storing an electrolyte suctioned from the secondary battery 100; the o-ring 764 formed on the hitch end 762 of the body 763 and sealing between the vacuum hole 721 of the vacuum manifold 72 and the vacuum nozzle 76; an elastic member 765 formed on a bottom portion of the hitch end 762 of the body 763; a fixing member 766 formed on a bottom portion of the elastic member 765 and preventing separation of the elastic member 765; and a pad 767 connected to an end of the body 763 and meeting with a top portion of the secondary battery 100. In this instance, it is desired that the elastic member 765 is made of an elastic spring.

An operation of the vacuum hopper 70 having the structure mentioned above is as follows. When the vacuum nozzle 76 meets with a top portion of the secondary battery 100, the vacuum nozzle 76 moves upward, and the vacuum nozzle 76 and the opening and closing member 77 become spaced apart from each other, thereby generating a space between the vacuum nozzle 76 and the opening and closing member 77. Then, when the vacuum pump 732 is turned on, the vacuum hole 721 of the vacuum manifold 72 and the hollow 761 of the vacuum nozzle 76 become a vacuum state, and thereby, an electrolyte of the secondary battery 100 is located on the hollow 761 of the vacuum nozzle 76. In this instance, gases contained the electrolyte is discharged to a venting device (not shown). When the gases contained in the electrolyte is discharged to the outside, air is injected into the vacuum manifold 72 through the air pump 733. When the air is injected into the vacuum manifold 72, the vacuum state of the vacuum hole 721 of the vacuum manifold 72 and the hollow 761 of the vacuum nozzle 76 is broken, and thereby, the electrolyte located in the hollow 761 of the vacuum nozzle 76 is injected into the secondary battery 100.

Thus, the present invention is configured such that the electrolyte of the secondary battery 100 and the gases contained in the electrolyte are suctioned through the vacuum hopper 70, the gases contained in the electrolyte are discharged to the outside, and the electrolyte is stored in the vacuum nozzle 76 of the vacuum hopper 70 and then supplied into the secondary battery 100, thereby reducing defects of the secondary battery 100 and lengthening the life thereof.

The pressurization part 80 is connected to the width bar 63 through a top portion of the pressurization part 80, is located in proximity to the vacuum hopper 70, and is a component for pressuring the top portion of the secondary battery 100. The pressurization part 80 has a square frame shape and comprises a fixing member 81 connected to a bottom portion of the first width bar 63a; and an elastic member 82 connected to a bottom portion of the fixing member 81, meeting with a top portion of the secondary battery 100, and providing an elastic force.

The elevator 40 is installed on a lower portion of the interior space 21 of the base frame 20 at an area corresponding to an area that the gas removal part 30 is located in, receives the secondary battery 100 on a top portion of the elevator 40, and moves the secondary battery 100 upward.

Since the elevator 50 is a component for elevating using a motor, detailed explanation will be omitted.

Although a vacuum hopper precharger according to preferred embodiments of the present invention has been described with reference to the particular illustrative embodiments with drawings, the present invention is not to be restricted by the embodiments mentioned above. It is to be appreciated that those skilled in the art can understand that the present invention may be varied or modified without departing from the spirit or scope defined by the invention.

MODE FOR INVENTION

According to the present invention to accomplish the above-mentioned object, a vacuum hopper precharger of the present invention comprises: a base frame 20 put in the floor and having an interior space 21; a gas removal part 30 installed on an upper portion of the interior space 21 of the base frame 20 and removing gases inside a secondary battery 100; an elevator 40 installed on a lower portion of the interior space 21 of the base frame 20 at an area corresponding to that of the gas removal part 30, receiving the secondary battery 100 on a top portion thereof, and moving the secondary battery 100 upward or downward; and a controller 50 controlling the gas removal part 30 and the elevator 40.

In this vacuum hopper precharger according to the present invention, the gas removal part 30 comprises: a fixing part 60 comprising a plate 61 fixed to and installed on an upper portion of the base frame 20 and a plurality of width bars 63 movably installed on a bottom side of the plate 61 in a length direction; a vacuum hopper 70 a top portion thereof connected to the width bar 63 of the fixing part 60 and removing gases inside the secondary battery 100, and a pressurization part 80 a top portion thereof connected to the width bar 63, disposed in proximity to the vacuum hopper 70, and pressurizing a top portion of the secondary battery 100.

In addition, in this vacuum hopper precharger according to the present invention, the fixing part 60 comprises: the plate 61 fixed to and installed on an upper portion of the base frame 20; a plurality of rails 62 installed on a bottom side of the plate 61 in a length direction; a plurality of first width bars 63a extending in a direction perpendicular to the length direction of the rails and movably connected to a bottom portion of the rails 62, wherein the pressurization part 80 is connected to a bottom portion of the first width bar 63a; a plurality of second width bars 63b extending in a direction perpendicular to the length direction of the rails 62, movably connected to the bottom side of the rails 62, wherein the vacuum hopper 70 is connected to a bottom portion of the second width bar 63b; a sensor 64 installed on an end of the bottom side of the plate 61, spaced apart from the rails 62, and sensing movements of the first width bar 63a and the second width bar 63b; a first drive motor 65 moving the first width bar 63a in the length direction, and a second drive motor 66 moving the second width bar 63b in the length direction.

Furthermore, in this vacuum hopper precharger according to the present invention, the vacuum hopper 70 comprises:
  a connection bar 71 connected to the bottom portion of the second width bar 63b; a vacuum manifold 72 connected to a bottom portion of the connection bar 71 and including a plurality of vacuum holes 721 penetrating the vacuum manifold 72 from a top side to a bottom side of the vacuum manifold 72; a cover 73 covering a top portion of the manifold 72; connectors 74 connected to both sides of the vacuum manifold 72, communicating with the vacuum hole 721 of the vacuum manifold 72, and one side of the connectors 74 connected to a vacuum pump 732 and an air pump 733; a connection pipe 75 connecting between the connectors 74; a vacuum nozzle 76 having a cylindrical shape with a hollow 761 inside, connected to the vacuum manifold 72 through a lower portion of the vacuum hole 721 of the vacuum manifold 72, and storing an electrolyte suctioned from the secondary battery 100; an opening and closing member 77 a top portion thereof connected to the cover 73, inserted into the vacuum manifold 72 through the top portion of the vacuum hole 721 of the vacuum manifold 72, a bottom portion thereof having a size corresponding to that of the hollow 761 of the vacuum nozzle 76 and located on a top portion of the vacuum nozzle 76, and opening or closing a top portion of the hollow 761 of the vacuum nozzle 76 by moving the vacuum nozzle 76 upward and downward; and a supporting holder 78 a top portion thereof connected to both side ends of the vacuum manifold 72 and a bottom portion thereof supporting a bottom portion of the vacuum nozzle 76.

In this vacuum hopper precharger according to the present invention, the vacuum nozzle 76 has a cylindrical shape with a hollow 761 inside, wherein the vacuum nozzle 76 comprises: a hitch end 762 formed on a top portion of an outer circumferential surface of the vacuum nozzle 76 and inserted through a bottom portion of the vacuum hole 721 of the vacuum manifold 72; a body 763 storing an electrolyte suctioned from the secondary battery 100; the o-ring 764 formed on the hitch end 762 of the body 763 and sealing between the vacuum hole 721 of the vacuum manifold 72 and the vacuum nozzle 76; an elastic member 765 formed on a bottom portion of the hitch end 762 of the body 763; a fixing member 766 formed on a bottom portion of the elastic member 765 and preventing separation of the elastic member 765; and a pad 767 connected to an end of the body 763 and meeting with a top portion of the secondary battery 100.

Moreover, in this vacuum hopper precharger according to the present invention, the pressurization part 80 has a square frame shape, wherein the pressurization part 80 comprises: a fixing member 81 connected to a bottom portion of the first width bar 63a; and an elastic member 82 connected to a bottom portion of the fixing member 81, meeting with a top portion of the secondary battery 100, and providing an elastic force.

INDUSTRIAL APPLICABILITY

According to a vacuum hopper precharger of the present invention mentioned above, it is expected that the vacuum hopper precharger will be used in various industries in that the vacuum hopper precharger is configured such that the electrolyte of a secondary battery and gases included in the electrolyte are suctioned through a vacuum hopper, the gases included in the electrolyte are discharged to the outside, and the electrolyte is stored in a vacuum nozzle of the vacuum hopper and then supplied into the secondary battery, thereby reducing defects of the secondary battery and lengthening the life thereof.

What is claimed is:

1. A vacuum hopper precharger comprising:
    a base frame configured to be put in a floor and having an interior space;
    a gas removal part installed on an upper portion of the interior space of the base frame and no configured to remove gases inside a secondary battery;
    an elevator installed on a lower portion of the interior space of the base frame at an area corresponding to that of the gas removal part, configured to receive the secondary battery on a top portion thereof, and configured to move the secondary battery upward or downward; and
    a controller controlling the gas removal part and the elevator,
    wherein the gas removal part comprises:
    a fixing part, the fixing part comprising:
        a plate fixed to and installed on an upper portion of the base frame,
        a plurality of rails installed on a bottom side of the plate,
        a plurality of width bars movably installed in a direction perpendicular to a longitudinal direction of the rails such that the plurality of width bars move along the longitudinal direction of the rails, the plurality of width bars comprising a plurality of first width bars and a plurality of second width bars that extend in the direction perpendicular to the longitudinal direction of the rails and movably connected to a bottom portion of the rails;
        a sensor installed on an end of the bottom side of the plate, spaced apart from the rails, and sensing movements of the first width bar of the plurality of first width bars and the second width bar of the plurality of second width bars;
    a first drive motor moving the first width bar of the plurality of first width bars in the longitudinal direction, and
    a second drive motor moving the second width bar of the plurality of second width bars in the longitudinal direction,
    a vacuum hopper a top portion thereof connected to the width bar of the plurality of width bars of the fixing part and configured to remove gases inside the secondary battery; and
    a pressurization part, a top portion thereof connected to the width bar of the plurality of width bars, disposed in proximity to the vacuum hopper, and configured to pressurize a top portion of the secondary battery,
    wherein the pressurization part is connected to a bottom portion of the first width bar of the plurality of first width bars,
    and the vacuum hopper is connected to a bottom portion of the second width bar of the plurality of second width bars,
    wherein the vacuum hopper comprises:
    a connection bar connected to the bottom portion of the second width bar of the plurality of second width bars;
    a vacuum manifold connected to a bottom portion of the connection bar and including a plurality of vacuum holes penetrating from a top side to a bottom side thereof;
    a cover covering a top portion of the vacuum manifold;
    connectors connected to both sides of the vacuum manifold, communicating with the vacuum hole, of the vacuum manifold, and one side thereof connected to a vacuum pump and an air pump;
    a connection pipe connecting between the connectors;
    a vacuum nozzle having a cylindrical shape with a hollow inside, connected to the vacuum manifold through a lower portion of the vacuum hole of the vacuum manifold, and configured to store an electrolyte suctioned from the secondary battery;
    an opening and closing member a top portion thereof connected to the cover, inserted into the vacuum manifold through the top portion of the vacuum hole of the vacuum manifold, a bottom portion thereof having a size corresponding to that of the hollow of the vacuum nozzle and located on a top portion of the vacuum nozzle, and opening or closing a top portion of the hollow of the vacuum nozzle by moving the vacuum nozzle upward and downward; and
    a supporting holder a top portion thereof connected to both side ends of the vacuum manifold and a bottom portion thereof supporting a bottom portion of the vacuum nozzle.

2. The vacuum hopper precharger according to claim 1, wherein the vacuum nozzle has a cylindrical shape with a hollow inside,
    wherein the vacuum nozzle comprises:
    a hitch end formed on a top portion of an outer circumferential surface of the vacuum nozzle and inserted through a bottom portion of the vacuum hole of the vacuum manifold;
    a body storing an electrolyte suctioned from the secondary batter;
    an o-ring formed on the hitch end of the body and sealing between the vacuum hole of the vacuum manifold and the vacuum nozzle;

an elastic member formed on a bottom portion of the hitch end of the body;
a fixing member formed on a bottom portion of the elastic member and preventing separation of the elastic in ember; and
a pad connected to an end of the body and meeting with a top portion of the secondary battery.

3. The vacuum hopper precharger according to claim 1, wherein the pressurization part has a square frame shape, wherein the pressurization part comprises: a fixing member connected to the bottom portion of the first width bar of the plurality of first width bars; and an elastic member connected to a bottom portion of the fixing member, meeting with a top portion of the secondary battery, and providing an elastic force.

* * * * *